United States Patent [19]

Breitmeier

[11] Patent Number: 5,126,579
[45] Date of Patent: Jun. 30, 1992

[54] OPTICAL THICKNESS MEASURING INSTRUMENT FOR TRANSPARENT WORK PIECES

[75] Inventor: Ulrich O. Breitmeier, Ettlingen, Fed. Rep. of Germany

[73] Assignee: Focus Messtechnik GmbH & Co KG, Ettlingen, Fed. Rep. of Germany

[21] Appl. No.: 603,548

[22] Filed: Oct. 26, 1990

[30] Foreign Application Priority Data

Nov. 16, 1989 [DE] Fed. Rep. of Germany ....... 3938113

[51] Int. Cl.$^5$ ............................................. G01N 21/86
[52] U.S. Cl. ..................................... 250/560; 356/382
[58] Field of Search .................... 250/560, 571, 201.2; 356/239, 382

[56] References Cited

U.S. PATENT DOCUMENTS 3,475,615 10/1969 Samuel ................................. 356/239
3,743,431 7/1973 Cushing et al. ..................... 356/239
4,310,242 1/1982 Genco et al. ........................ 356/239

Primary Examiner—David C. Nelms
Assistant Examiner—Khaled Shami
Attorney, Agent, or Firm—Fred Philpitt

[57] ABSTRACT

Figure 1:
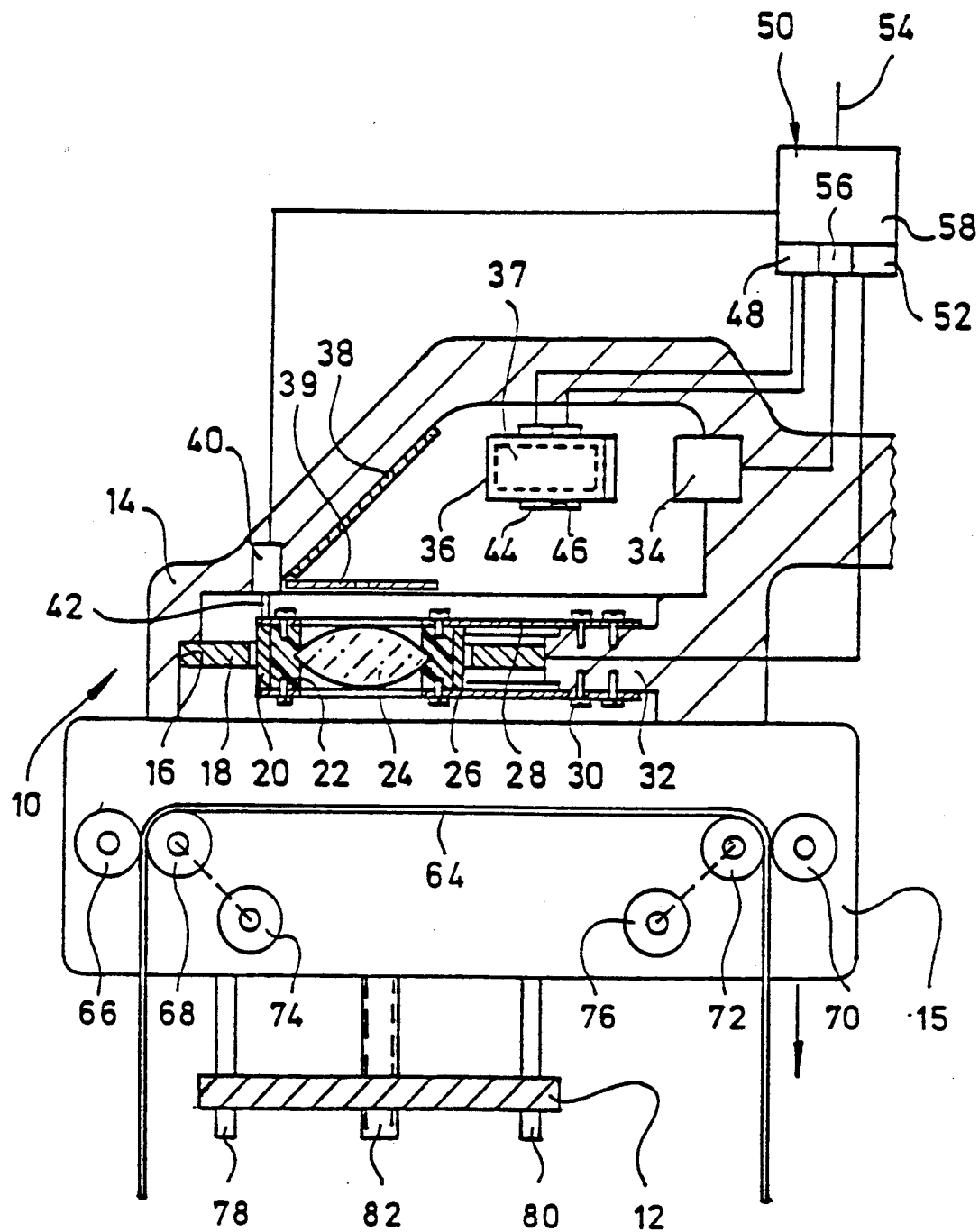

An optical thickness measuring instrument for transparent work-piece, in particular glass plates and transparent films, consists of a scanning head (10) with a servo-controlled measuring lens (24), a mirror (12) arranged perpendicularly to the axis of the latter and means (66 to 72) for positioning the work-piece (64) in parallel above the mirror (12). The servo control adjusts the measuring lens (24) so that a measuring light source (34) is focussed on the surface of the mirror. For this purpose, the measuring lens (24) must be adjusted by the associated servo drive (18, 20) depending on the thickness of the work-piece (64). The electrically measured (40) adjustment displacement of the measuring lens (24) is a measurement of the thickness of the work-piece (64). (FIG. 1).

8 Claims, 2 Drawing Sheets

OPTICAL THICKNESS MEASURING INSTRUMENT FOR TRANSPARENT WORK PIECES

The invention relates to an optical thickness measuring equipment for transparent work-pieces, in particular glass plates and transparent films.

WO 89/06339 describes an instrument for the high-resolution measurement of fine surface contours of a work-piece, whereof the measuring head is based on the technology of the reading heads of CD players. With an instrument of this type, even very fine surface contours can be measured quickly, reliably and in a form which is easy to process further in data processing equipment.

Now it was realised that one can use this technology with slight modifications to the instrument, for the precise measurement of thickness of transparent work-pieces. Instead of a contoured work-piece surface, a stationary mirror is placed opposite the measuring lens and the transparent work-piece is placed in the space lying between the measuring lens and mirror. Due to the work-piece, the optical path is varied according to its thickness and the refraction index of its material. With a known refraction index, the working signal produced by the detection device is thus a direct measurement of the thickness of the work-piece.

Since the technology disclosed in WO 89/06339 is designed specifically for measuring very small surface contours, due to its transfer to the measurement of thickness of transparent work-pieces, one also obtains a high accuracy measurement of thickness variations. This is of great significance for example in the quality control of thin, transparent films.

Advantageous developments of the invention are described hereinafter.

With the development of the invention according to one embodiment it is provided that one can balance the measuring instrument so that when a work-piece with a reference thickness is located between the measuring lens and mirror, exact focussing conditions are encountered. With this basic adjustment, variations of thickness are then reproduced in a particularly accurate and satisfactory linear manner by the working signal emitted by the detection device.

In a thickness measuring instrument according to another embodiment, for adjusting the focussing conditions, it is necessary to vary solely the distance between the mirror and measuring lens.

The development of the invention according to another embodiment is an advantage with regard to the greatest possible linear partial range of the characteristic of the thickness measuring instrument.

Even in the case of transparent work-pieces, part of the light is reflected on the work-piece surface. With the development of the invention according to another embodiment it is provided that disturbance reflections of this type reach the detection device with considerable defocussing, thus illuminate the latter uniformly and produce solely a constant, substantially symmetrical disturbance background, thus influence solely the absolute position of the characteristic, but not its steepness.

In a thickness measuring instrument according to another embodiment, it is guaranteed that the film webs to be measured always travel through the measuring section with an exactly identical orientation, free from sagging and folds.

The development according to another embodiment is an advantage with regard to a particularly keen detection of irregularities in the transparent work-piece, since both changes in the length of the optical path caused thereby as well as variations in the diffusion behavior caused thereby, are taken into consideration.

In practice, in addition to the measuring light reflected according to the geometrical optics, one also obtains interferences and diffraction patterns, which may be asymmetrical with respect to the axis of the beam and would then lead to adulteration of the measurement result. With the development of the invention according to another embodiment it is guaranteed that interferences and diffraction patterns of this type are blocked out and do not reach the detection device.

Figure 2:
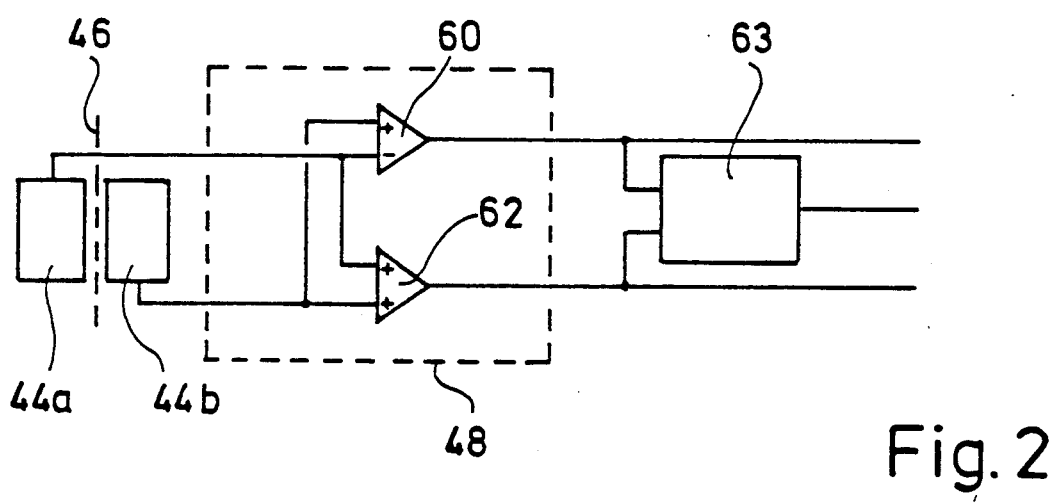

The invention will be described in detail hereafter by means of one embodiment, referring to the drawings, in which:

FIG. 1 is a diagrammatic vertical section through an optical thickness measuring instrument for transparent films with an optical scanning head known per se as regards its characteristics, for the high resolution measurement of a work-piece surface together with an associated electronic unit, part of a film web and a device for guiding the same in the plane provided; and FIG. 2 is the circuit diagram of an input circuit of the electronic unit shown in FIG. 1;

In FIG. 1, a scanning head 10 is designated generally by the reference numeral 10, which has been developed per se for the high accuracy measurement of surface roughnesses and surface structures on the surface of a work-piece 12.

The scanning head 10 has a housing 14, which is substantially cup-shaped. Fixed in a lower opening 16 of the housing 14 is a toroidal coil 18, which produces an axial magnetic field. The toroidal coil 18 cooperates with an annular permanent magnet 20, which is stuck to the outside of a lens ring 22. As a modification, the toroidal coil 18 and permanent magnet 20 may also be exchanged.

The lens ring 22 holds a lens 24. The unit formed by the permanent magnet 20, the lens ring 22 and the lens 24 passes with radial clearance through the toroidal coil 18 and is supported by two leaf springs 26, 28 extending in parallel to each other. Its section located on the left in FIG. 1 is constructed in the form of spectacles, so that the lens 24 remains free, whereas the section located on the right is in the shape of a strip and is fixed at its outermost end by screws 30 to a web 32 of the housing 14. The leaf springs 26, 28 thus form a resilient parallelogram suspension for the lens 24.

A semi-conductor laser 34, operating in the red range, is attached in the section of the peripheral wall of the housing 14 located on the right in FIG. 1. the laser beam emitted by the latter passes through a semi-transparent measuring mirror 36 and reaches a deflection mirror 38. The light beam then passes through a narrow pin hole 39 (wave guide) and the lens 24 and is focussed by the latter on the surface of a mirror 12.

The pin hole 39 is in reality located in the focal plane of the lens 24 on the image side, it was only located below the deflection mirror 38 for the sake of greater clarity in FIG. 1.

The laser light reflected by the surface of the mirror is focussed by the lens 24 and passes through the pin hole 39, where portions of light subject to interference and diffraction are held back, by way of the deflection mirror 38 back to the measuring mirror 36. The latter separates part of the reflected measuring light and directs it by way of a prism 37 located behind it in FIG. 1, to a photoelectric converter arrangement 44, whereof the center is illustrated at 46. The photoelectric converter arrangement 44 has (see FIG. 2) two converter elements 44a and 44b arranged symmetrically with respect to the central line 46 and produces an output signal, which depends on the position of the incident light spot with regard to the center line 46. This output signal passes to an input circuit 48 of an electronic unit associated with the scanning head 10 and designated generally by the reference numeral 50.

As a modification of the embodiment illustrated, the converter arrangement 44 may also comprise a photodiode cell, a photodiode matrix, an image converter (CCD) or another arrangement of closely adjacent light-sensitive elements.

The electronic unit 50 in this case contains circuits which are not shown in detail, which ascertain the deviation of the instantaneously obtained output signal of the converter arrangement 44 from that signal which is obtained when the measuring light is incident upon the center line 46. According to the difference between these two signals, the electronic unit 50 internally produces a working or fault signal for a power amplifier 52, which supplies the toroidal coil 18. The supply current for the toroidal coil 18 is increased or reduced until the measuring light spot on the converter arrangement 44 again lies on the center line 46. This is the case when the distance between the lens 24 and the illuminated point of the surface of the mirror 12 corresponds exactly to the focal length of the lens.

From the description given so far, it can be seen that the lens 24 is moved axially according to the optical path between the under side of the housing and the plane of the mirror. A corresponding electrical signal is obtained from a position indicator 40 cooperating with the movable lens unit and the latter is made available on a line 54 by the electronic unit 50 for use in an external computer or another signal-processing device.

In FIG. 1, a power amplifier 56 of the electronic unit 50 is also shown diagrammatically, which unit supplies the laser 34.

The scanning head 10 is sensitive to mechanical interference effects, in particular vibrations and oscillations. In order to obviate an adulteration of the measurement by mechanical interference effects of this type, a control circuit designated generally by the reference numeral 58 in FIG. 1, of the electronic unit 50 has a special construction, which is described in more detail in WO 89/06339. In addition to the output signal of the input circuit 48, the control circuit 58 receives the output signal of the position indicator 40, which ascertains directly the actual position of the lens 24, for example in the form of a moving-coil system, which cooperates with an indicator rod 42 moved together with the lens 24.

As can be seen from FIG. 2, the input circuit 48 contains a differential amplifier 60 as well as an adding amplifier 62. Both amplifiers receive the output signals of the two converter elements 44a and 44b located on both sides of the center line 46 of the converter arrangement 44. The output signal of the differential amplifier 60 is associated with the optical path between the illuminated point of the surface of the mirror 12 and the focal point of the lens 24, whereas the output signal of the adding amplifier 62 is a measurement of light losses in the measuring section.

Two pairs of conveying rollers 66, 68 or 70, 72 are provided for guiding a transparent, flexible, thin film web 64 on a path extending perpendicular to the axis of the lens 24 and adjacent the under side of the housing 14. The conveying rollers 66, 68 lying upstream of the measuring section are connected to a brake 74, the conveying rollers 70, 72 located downstream of the measuring section are driven by a motor 76. In this way, the film web 64 travels through the measuring section without sagging and without folds.

The various conveying rollers 66 to 72, the brake 74 and the motor 76 are supported by lateral cheeks 15 of the housing 14.

As can also be seen from FIG. 1, the mirror 12 is arranged to slide on guide rods 78, 80, which project downwards from the housing 14. A fine threaded spindle 82 serves for the fine adjustment of the mirror 12 in the axial direction of the lens 24.

If the mirror 12 is pre-set so that when the toroidal coil 18 is not energized, the laser beam is focussed by the lens 24 on the surface of the mirror, when the film web 64 is guided through the measuring section, the focal point of the laser beam is then located slightly behind the surface of the mirror. Accordingly, by energizing the toroidal coil 18, the lens 24 is now moved upwards in FIG. 1, until the focal point again lies on the surface of the mirror. On the line 54, one receives an electrical signal associated with the thickness of the film web 64 at the point lying in the path of the beam.

If one places a film web section with a reference thickness in the measuring section and then rotates the fine threaded spindle 82 so that the signal on the line 54 disappears, one again has a de-energized toroidal coil 18, under reference conditions, i.e. the lens 24 is normally in its central position and the scanning head operates in the measurement of variations of thickness in the best linear partial range of its characteristic. The signal on the line 54 is now associated with deviations of the film thickness from the reference value.

The output signals of the differential amplifier 60 and of the adding amplifier 62 may now be combined by a combinational switching circuit 63, for example in multiplication form or in AND-gating. Its output signal gives a particularly striking picture of errors in the film web, since local light losses and local fluctuations of thickness can frequently be attributed to the same causes and the electrical signals corresponding to these quantities are combined by the combinational switching circuit 63 to form a signal doubly dependent on the same causes and therefore varying in a particularly striking manner.

If desired, one can also use solely the output signal of the adding amplifier 62 and receive a picture of the film web derived from the local dispersion behavior.

I claim:

1. Optical thickness measuring instrument for transparent workpieces, in particular glass plates and transparent films, with
   (a) a stationary mirror (12);
   (b) means (66 to 72) for positioning the workpiece in a plane extending at a distance in parallel in front of the mirror (12);
   (c) a measuring lens (24) whereof the axis is perpendicular to the mirror (12),
   (d) a measuring light source (34), which is focussed on the mirror (12) by the measuring lens (24);
   (e) a detection device (44 to 63), on which the measuring light reflected by the mirror (12) is focussed by the measuring lens (24) and which produces a working signal associated with the distance between the focal point of the measuring lens (24) and the mirror (12).

2. Thickness measuring instrument according to claim 1 with
- f) means (78 to 82) for adjusting the distance between the measuring lens (24) and mirror (12) and/or between the measuring lens (24) and detection device (44 to 63).

3. Thickness measuring instrument according to claim 2, in which
- g) the measuring light source (34) produces a parallel beam and is preferably a laser.

4. Thickness measuring instrument according to claims 1, with
- h) means (26, 28) for the movable mounting of the measuring lens (24) in the axial direction;
- i) a servo drive (18, 20) acting on the measuring lens (24); and
- k) a control circuit (50) acting on the servo drive (18, 20), which control circuit (50) receives the working signal produced by the detection device (44 to 63) and controls the servo drive (18, 20) so that the working signal is minimized.

5. Thickness measuring instrument according to claim 1, in which
- the plane, in which the work-piece (64) is positioned, lies close to the measuring lens (24).

6. Thickness measuring instrument according to claim 1 for checking the dimensions of flexible, transparent film webs, with
- m) means (66 to 76) for adjusting a predetermined tension in the film web (64).

7. Thickness measuring instrument according to claims 1 in which
- n) the detection device (44 to 63) simultaneously produces a second working signal associated with the intensity of the light incident thereon; and
- o) a combinational switching circuit (63) combines the first working signal and the second working signal as a total working signal, for example by multiplication or logic AND-gating.

8. Thickness measuring instrument according to claim 1, characterized in that a wave guide (39) is located in the focal plane on the image side of the measuring lens (24).

* * * * *